(No Model.)
W. M. BALDWIN, Jr.
CORN SHOCK COMPRESSOR.
No. 244,166. Patented July 12, 1881.
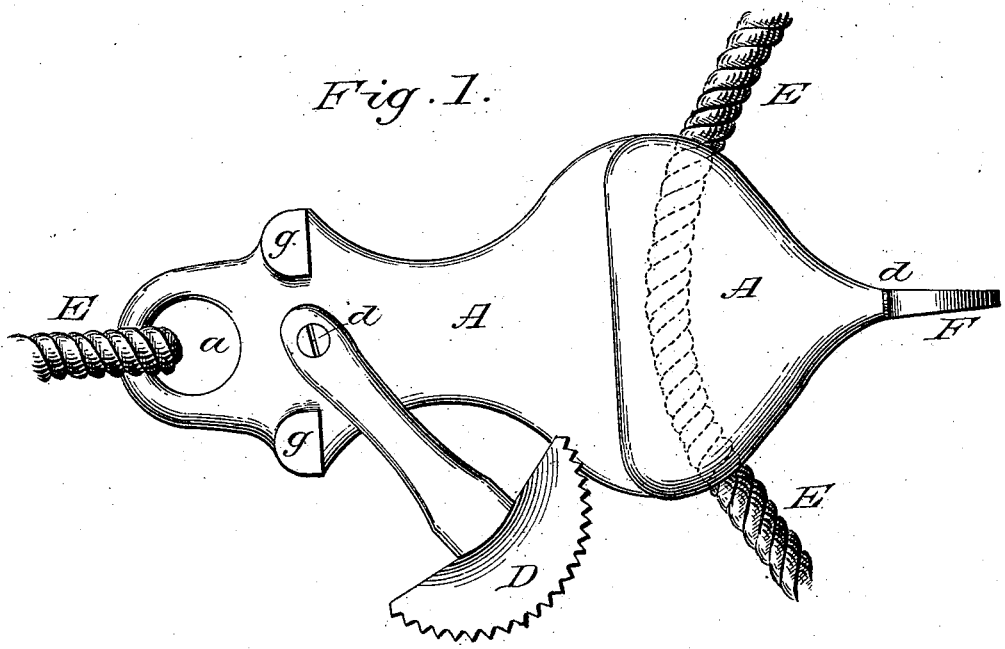
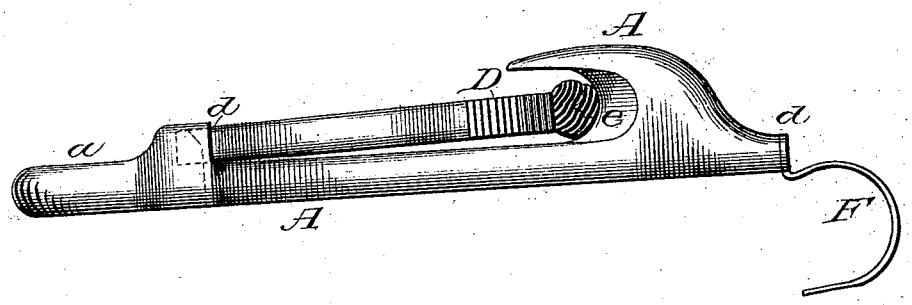
Witnesses:
Thomas W. Jones
Geo. W. Robinson
Inventor
Wm. M. Baldwin Jr.

UNITED STATES PATENT OFFICE.

WILLIAM M. BALDWIN, JR., OF NEWARK, OHIO.

CORN-SHOCK COMPRESSOR.

SPECIFICATION forming part of Letters Patent No. 244,166, dated July 12, 1881.

Application filed May 21, 1881. (No model.)

*To all whom it may concern:*

Be it known that I, WILLIAM M. BALDWIN, Jr., a citizen of the United States, residing at Newark, in the county of Licking and State of Ohio, have invented a new and Improved Corn-Shock Compressor, of which the following is a specification.

The object of my invention is the production of a device by which shocks of cornstalks may be easily drawn and compressed together and temporarily held while a permanent binder of any suitable material is secured around the shock.

The invention consists, principally, of a block irregular in shape, having a groove semicircular in form, a pivoted dog fastened to its anterior surface, a pivoted hook at one end, and an eye for rope or cord, and stays to support the dog at suitable angle.

In the accompanying drawings, Figure 1 is a front elevation of my invention, and Fig. 2 is a side elevation of the same.

Similar letters of reference indicate corresponding parts.

A represents the irregular block, which is preferably of malleable iron or similar metal, formed with the eye *a*, to which the cord or rope E is secured. The dog or clamp D is pivoted to the front or anterior surface of the block by the pivot *d*, so that the curved and serrated head D will clamp the rope E when in the groove *e*, as shown in Fig. 1, and hold it firmly. The stays *g g*, on anterior surface of A, and on either side of pivot *d*, serve to keep the dog D at the proper angle.

In use the pivoted hook F is first engaged with the shock being bound, upon one side thereof. The rope or cord is then passed around the shock and drawn into the groove *e*. The pivoted hook F is to engage upon a stalk of corn in one side of the shock, thus holding the compressor in place while the operator may pass the rope around the shock, and place the end thereof in the groove *e*. The hook F is pivoted, that it may thereby be turned to the right or left side of the compressor, and thus enable the operator to pass around the shock in either direction and bind the same with facility. When the shock has been sufficiently compressed the dog is made to fall upon the rope or cord, which clamps the same between it and the groove, and thus securely binds and holds the shock until a permanent binder is secured around it. This having been done, the temporary (binder or) compressor is removed by a quick jerk of the end of the rope or cord in the hands of the operator, causing the clamp or dog to disengage from the rope, so loosening the same, and then carrying the rope off from the groove.

It will be observed that by this means the shocks may be made very compact and firm, which is of great advantage in resisting the weather, and the shocks are bound with comparatively little trouble and exertion.

Having thus described my invention, I claim as new and desire to secure by Letters Patent—

1. The block A, with a semicircular groove formed in it, and the eye *a*, as means of securing a rope or cord, E, thereto, in combination with the pivoted dog D, and the pivoted hook F, substantially as and for the purpose specified.

2. The corn-shock compressor herein shown and described, consisting of the block A, with groove *e*, pivoted dog D, pivoted hook F, the eye *a*, and the stays *g g*, and the rope or cord E, substantially as and for the purpose set forth.

WILLIAM M. BALDWIN, JR.

Witnesses:
ELLIS JONES,
J. W. LATIMER.